(12) United States Patent
Åkeson et al.

(10) Patent No.: US 7,849,946 B2
(45) Date of Patent: Dec. 14, 2010

(54) DEVICE FOR TRUCK CAB SUSPENSION

(75) Inventors: Johan Åkeson, Stallarholmen (SE); Jonas Lind, Rönninge (SE)

(73) Assignee: Scania CV AB (publ) (SE)

( * ) Notice: Subject to any disclaimer, the term of this patent is extended or adjusted under 35 U.S.C. 154(b) by 492 days.

(21) Appl. No.: 11/570,168

(22) PCT Filed: Jun. 3, 2005

(86) PCT No.: PCT/SE2005/000842

§ 371 (c)(1),
(2), (4) Date: Jun. 9, 2008

(87) PCT Pub. No.: WO2005/120935

PCT Pub. Date: Dec. 22, 2005

(65) Prior Publication Data

US 2008/0245589 A1    Oct. 9, 2008

(30) Foreign Application Priority Data

Jun. 7, 2004    (SE) .................................... 0401439

(51) Int. Cl.
*B62D 33/067* (2006.01)
(52) U.S. Cl. .............................. 180/89.14; 296/190.05; 296/190.07
(58) Field of Classification Search .............. 180/89.14, 180/89.13, 89.18; 296/190.05, 190.07
See application file for complete search history.

(56) References Cited

U.S. PATENT DOCUMENTS

| 3,642,316 A | * | 2/1972 | Porth et al. | ............ 296/190.05 |
| 3,667,565 A | * | 6/1972 | Steiner et al. | .............. 180/89.1 |
| 3,797,883 A | * | 3/1974 | Steiner et al. | ............ 180/89.14 |
| 3,831,999 A | * | 8/1974 | Sonneborn | ............... 180/89.14 |
| 3,944,017 A | * | 3/1976 | Foster | ..................... 180/89.15 |
| 3,958,659 A | * | 5/1976 | Selman | ................... 180/89.15 |
| 4,235,299 A | * | 11/1980 | Reynolds | .................... 180/328 |
| 4,372,411 A | * | 2/1983 | Flower | .................... 180/89.15 |
| 4,429,759 A | * | 2/1984 | Clark | ...................... 180/89.14 |

(Continued)

FOREIGN PATENT DOCUMENTS

DE    2161953 A1    6/1973

(Continued)

OTHER PUBLICATIONS

International Search Report PCT/SE2005/000842 dated Aug. 12, 2005 (Swedish Patent Office).

*Primary Examiner*—Paul N Dickson
*Assistant Examiner*—Timothy D Wilhelm
(74) *Attorney, Agent, or Firm*—Ostrolenk Faber LLP

(57) ABSTRACT

Device for truck cab suspension comprising a forward cab suspension which itself comprises a carrier frame fastened to the cab and the frame is arranged on each long side of the truck close to a stabilizer. An articulation device allows forward tilting of the carrier frame and the cab. The tilting is caused by at least one tilt cylinder. The cab suspension comprises a cab spring adapted to acting between the truck chassis and the carrier frame. The carrier frame is supported for pivoting relative to the forward lower portion of each of two end pieces which form part of the carrier frame and are each connected to their respective stabilizer which is situated rearward from the forward lower portion and is supported by the truck chassis.

9 Claims, 3 Drawing Sheets

U.S. PATENT DOCUMENTS

| | | | |
|---|---|---|---|
| 4,735,272 A * | 4/1988 | Sjostrom et al. | 180/89.14 |
| 4,739,853 A * | 4/1988 | Ogilvie | 180/89.12 |
| 5,209,316 A * | 5/1993 | Bauer | 180/89.14 |
| 5,398,774 A * | 3/1995 | Nilsson et al. | 180/89.14 |
| 6,439,651 B1 * | 8/2002 | Johansson et al. | 296/190.07 |
| 6,540,283 B1 * | 4/2003 | Johansson et al. | 296/190.05 |
| 7,140,669 B2 * | 11/2006 | Bollinger et al. | 296/190.07 |
| 7,673,931 B2 * | 3/2010 | Takano et al. | 296/190.01 |

FOREIGN PATENT DOCUMENTS

| | | |
|---|---|---|
| DE | 4240449 A1 | 6/1994 |
| GB | 1419796 A | 12/1975 |

\* cited by examiner

DEVICE FOR TRUCK CAB SUSPENSION

CROSS REFERENCE TO RELATED APPLICATION

The present application is a 35 U.S.C. §§371 national phase conversion of PCT/SE2005/000842, filed 3 Jun. 2005, which claims priority of Swedish Application No. 0401439-5, filed 7 Jun. 2004. The PCT International Application was published in the English language.

BACKGROUND

1. Technical Field

The present invention relates to a device for cab suspension for trucks which enables the cab to tilt forward and wherein the suspension comprises springs.

2. Description of State of the Art

Devices for the purpose indicated above are previously known. Such known arrangements are designed inter alia in such a way that the cab stabilisers' torsion springs and hence the stabiliser set-up are positioned at the front of the cab and constitute together with tilt cylinders and cab springing a protruding and relatively bulky configuration.

The object of the present invention is to provide a device for cab suspension which is substantially more compact than what is available in the state of the art and which thereby frees space for, for example, crash zone and radiator.

SUMMARY OF THE INVENTION

The above object is achieved by what is specified in the attached claim 1.

Further advantages are afforded by what is indicated in the dependent claims.

BRIEF DESCRIPTION OF THE DRAWINGS

The invention is described below in more detail with reference to embodiments and the attached drawings, in which.

DETAILED DESCRIPTION OF PREFERRED EMBODIMENTS

Figure 1:
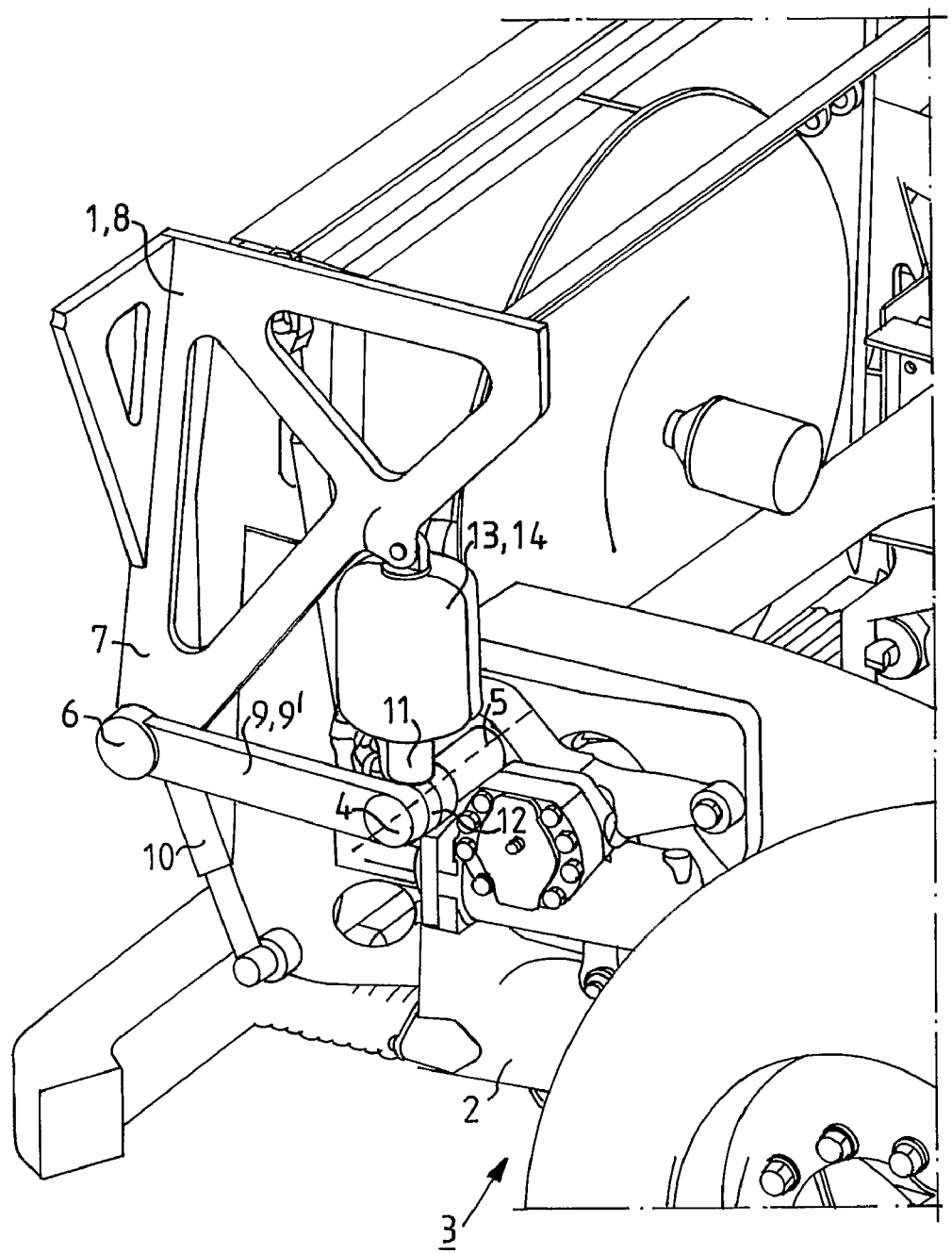
FIG. 1 depicts schematically a perspective view of, inter alia, a first embodiment of a truck cab suspension system according to the invention as seen obliquely from the rear and from above on the left side of the truck, the depiction being of a state corresponding to when the cab is retracted.

In FIG. 1, a carrier frame 1 is fastened to the cab and forms part of a forward cab suspension, although the cab itself, inter alia, is not depicted in the drawings. The carrier frame is so arranged that at each long side 2 of a truck 3 it is close to a stabiliser 4 which is preferably of torsion type and the stabiliser is arranged with its pivot spindle 5 transverse to the longitudinal direction of the truck. The stabiliser 4 is outward of the truck chassis 2.

According to the version depicted, the carrier frame 1 is adapted to being supported by articulation means 6 relative to the forward lower portion 7 of each of two endpieces 8 which form part of the carrier frame and are each situated on their respective long side 2 of the truck, which endpieces are connected to one another rearward, as seen in the longitudinal direction of the truck, from said forward lower portion 7, and by stabilisers supported by the truck chassis, as depicted in the drawings.

Said forward lower portion is preferably connected to the stabiliser by connection means 9 running from said portion, e.g. an arm 9', which is adapted to transmitting a rotary movement to undepicted torsion elements of the stabiliser.

According to preferred embodiments, there is a shock absorber 10 acting between said forward lower portion and the truck chassis.

Figure 2:
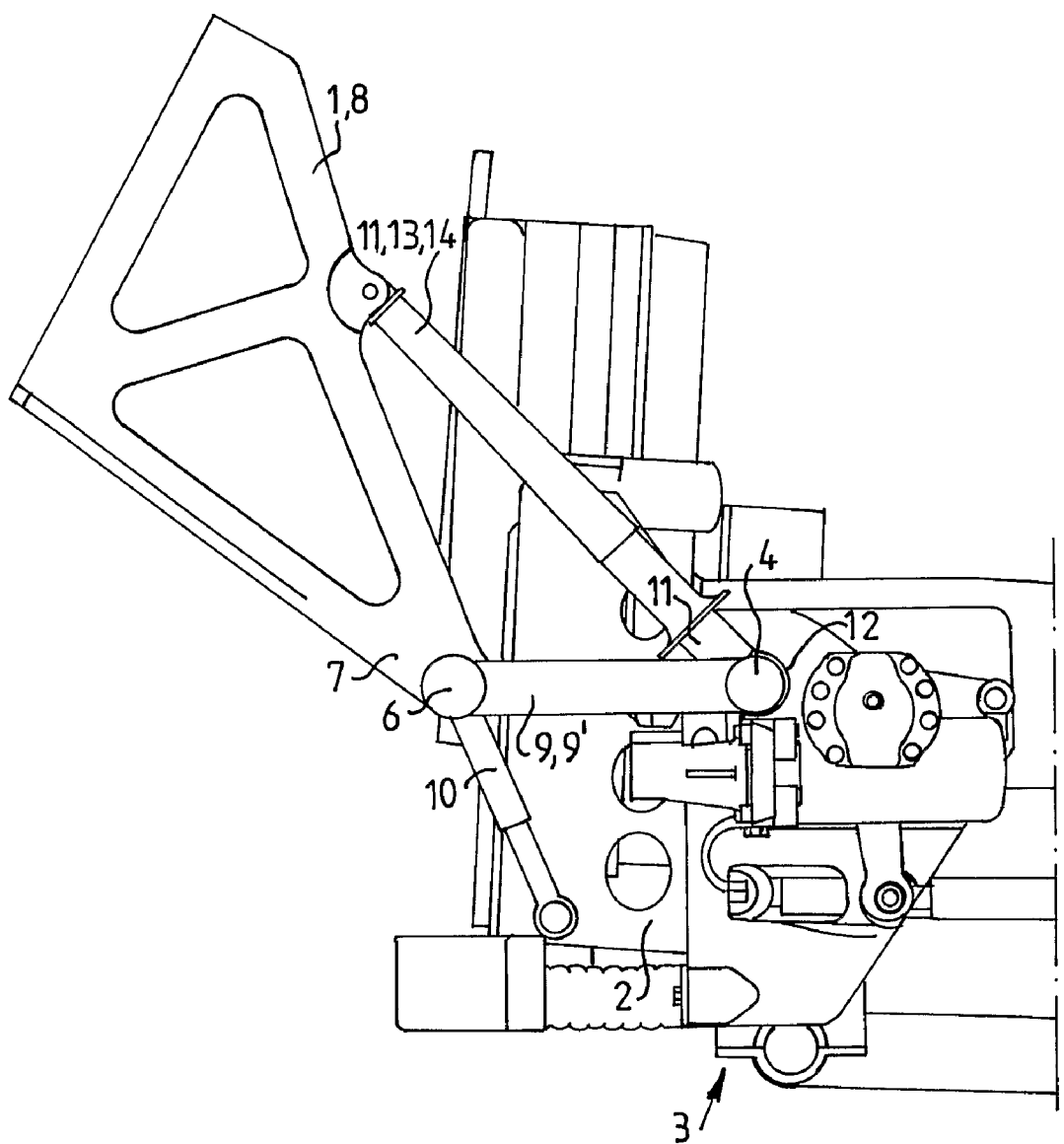
FIG. 2 depicts schematically a system according to FIG. 1 as seen when looking at the left side of the vehicle in FIG. 1 and in a state corresponding to when the cab is tilted upwards and forwards.
Figure 3:
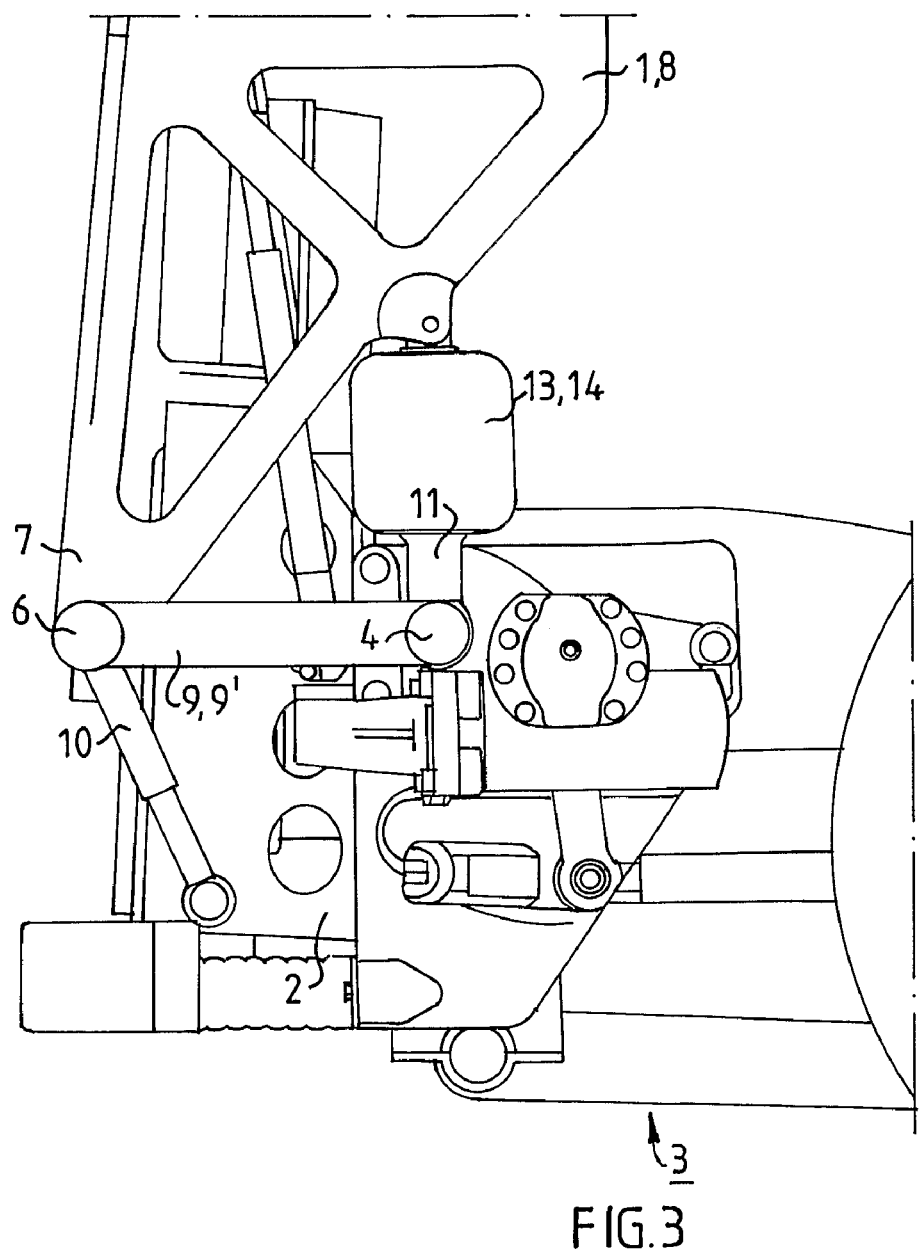
FIG. 3 depicts schematically the same as FIG. 2 but in a state corresponding to when the cab is retracted.

A tilt cylinder 11 is supported for pivoting close to a stabiliser and is adapted to acting upon one of said endpieces for tilting of the cab, as depicted in FIGS. 2 and 3. According to the version depicted, the cylinder is adapted to pivoting by means of an external articulation 12 about the stabiliser's torsion elements.

A version whereby at least one tilt cylinder is supported for pivoting relative to the truck's engine or frame and is adapted to acting upon the cab floor for tilting of the cab is not depicted.

According to versions preferred in certain cases, a tilt cylinder is arranged in combination with cab spring means 13. According to the version depicted in the drawings, the cab spring means 13 comprises an air cylinder 14 arranged about the tilt cylinder, which air spring is extensible, as depicted in FIG. 2.

The function of the device according to the invention is perhaps substantially indicated above. The set-up for stabilisers and tilt cylinders is thus rearward from, behind, the pivotable support for the carrier frame, whereby the loadbearing portions of the arrangement which are to be supported by the truck chassis can be moved in from the front of the truck, thereby freeing space for, for example, crash zone and radiator. The result, particularly if stabilisers, tilt cylinders and cab spring means are combined in an in principle common set-up, is a very compact and, as regards space, effective arrangement.

The invention is described above in relation to embodiment examples and preferred embodiments. Further embodiments, and minor modifications and additions, are of course conceivable without thereby departing from the fundamental concept of the invention.

According to the version depicted, the endpieces 8 have a substantially triangular latticework configuration. Other configurations, e.g. lamelliform, are conceivable.

It is also conceivable, preferably with maintenance of a largely common set-up, for tilt cylinders and cab spring means to be more clearly separated.

The invention is thus not to be regarded as limited to the embodiments indicated above but may be varied within its scope indicated by the attached claims.

The invention claimed is:

1. A device for truck cab suspension wherein
    the cab suspension is located on a long side of a truck and includes a stabilizer at the long side of the truck and rearward of a front of the cab,
    the device comprising
    a forward cab suspension which comprises a carrier frame fastenable to the cab and arranged so that on each long side of the truck, the frame is close to the stabilizer
    an articulation device connected between the carrier frame and the stabilizer and operable to allow forward tilting of the cab, the articulation device including a tilt cylinder that tilts the cab by the cylinder expanding and retracting, the cab suspension comprises a cab spring arrangement which acts between the truck chassis and the carrier frame, two endpieces which form part of the carrier frame and each connected to the stabilizer, the carrier frame is supported for pivoting at a forward lower portion of the end pieces; the stabilizer is situated rearward from the forward lower portion and is supported by the truck chassis and the stabilizer is situated outward of the truck chassis.

2. A device according to claim 1, further comprising a connector from the forward lower portion to the stabilizer.

3. A device according to claim 2, further comprising a tilt cylinder pivotally supported at a location close to the stabilizer, and the tilt cylinder is operable to act upon one of the endpieces for tilting of the cab.

4. A device according to claim 1, wherein the truck has an engine and the cab has a floor; the device further comprising a tilt cylinder is supported for pivoting close to the truck engine or frame and being adapted to act upon the cab floor for tilting the cab.

5. A device according to claim 1, further comprising a tilt cylinder operable to act upon of the endpieces for tiling the cab; and a cab spring arranged in combination with the tilt cylinder.

6. A device according to claim 5, wherein the cab spring comprises an air spring arranged about the tilt cylinder.

7. A device according to claim 1, further a shock absorber acting between the forward lower portion and the truck chassis.

8. A device according to claim 1, further comprising a tilt cylinder pivotally supported at a location close to the stabilizer and the tilt cylinder is operable to act upon one of the endpieces for tilting of the cab.

9. A device according to claim 3, further comprising a shock absorber acting between the forward lower portion and the truck chassis.

\* \* \* \* \*